US012716109B2

(12) United States Patent
Taneda et al.

(10) Patent No.: US 12,716,109 B2
(45) Date of Patent: Aug. 25, 2026

(54) HIGHLY CORROSION-RESISTANT STAINLESS STEEL COMPONENT AND METHOD OF MANUFACTURING SAME, METHOD OF HEAT-TREATING STAINLESS STEEL COMPONENT, AND ROLLING BEARING AND METHOD FOR MANUFACTURING SAME

(71) Applicant: MINEBEA MITSUMI Inc., Nagano (JP)

(72) Inventors: Syota Taneda, Nagano (JP); Keiki Maeno, Nagano (JP)

(73) Assignee: MINEBEA MITSUMI INC., Nagano (JP)

(*) Notice: Subject to any disclaimer, the term of this patent is extended or adjusted under 35 U.S.C. 154(b) by 376 days.

(21) Appl. No.: 18/044,098

(22) PCT Filed: Sep. 25, 2020

(86) PCT No.: PCT/JP2020/036329
§ 371 (c)(1),
(2) Date: Mar. 6, 2023

(87) PCT Pub. No.: WO2022/064643
PCT Pub. Date: Mar. 31, 2022

(65) Prior Publication Data
US 2023/0323499 A1 Oct. 12, 2023

(51) Int. Cl.
*C21D 9/40* (2006.01)
*C21D 1/18* (2006.01)
(Continued)

(52) U.S. Cl.
CPC ................ *C21D 9/40* (2013.01); *C21D 1/18* (2013.01); *C21D 6/002* (2013.01); *C21D 6/005* (2013.01);
(Continued)

(58) Field of Classification Search
CPC . C21D 1/18; C21D 1/76; C21D 6/002; C21D 6/005; C21D 6/008; C21D 6/04;
(Continued)

(56) References Cited

U.S. PATENT DOCUMENTS 8,591,673 B2 * 11/2013 Yamada ................. F16C 33/62 420/64
2010/0054649 A1 3/2010 Yamada
(Continued)

FOREIGN PATENT DOCUMENTS

EP 2 159 295 A2 3/2010
JP H09-302449 A 11/1997
(Continued)

OTHER PUBLICATIONS

WO 2018025063 A1 Machine translation (Year: 2018).*
(Continued)

*Primary Examiner* — Tima M. Mcguthry-Banks
(74) *Attorney, Agent, or Firm* — Chrisman Gallo Tochtrop LLC

(57) ABSTRACT

To provide a highly corrosion-resistant stainless steel component made of martensitic stainless steel achieving both high corrosion resistance and high hardness without containing ferrite at a surface layer portion. The highly corrosion-resistant stainless steel component is made of martensitic stainless steel containing, by weight, from 0.35 to 0.43% of C, 0.5% or less of Si, 0.5% or less of Mn, 0.04% or less of P, 0.04% or less of S, from 15 to 17% of Cr, from 0.1 to 0.3% of W, from 1.5 to 3.0% of Mo, from 0.001 to 0.005% of B, and from 0.12 to 0.18% of N, with the balance being Fe and an inevitable impurity. The matrix structure of the surface layer portion of the entire outer surface is a two-phase mixed structure containing retained austenite and martensite, and the surface hardness is HRC 57 or more.

6 Claims, 2 Drawing Sheets

(51) Int. Cl.

| | |
|---|---|
| ***C21D 6/00*** | (2006.01) |
| ***C21D 6/04*** | (2006.01) |
| ***C22C 38/00*** | (2006.01) |
| ***C22C 38/02*** | (2006.01) |
| ***C22C 38/04*** | (2006.01) |
| ***C22C 38/22*** | (2006.01) |
| ***C22C 38/32*** | (2006.01) |
| ***F16C 33/62*** | (2006.01) |
| ***F16C 33/64*** | (2006.01) |

(52) U.S. Cl.
CPC ............... *C21D 6/008* (2013.01); *C21D 6/04* (2013.01); *C22C 38/001* (2013.01); *C22C 38/002* (2013.01); *C22C 38/02* (2013.01); *C22C 38/04* (2013.01); *C22C 38/22* (2013.01); *C22C 38/32* (2013.01); *F16C 33/62* (2013.01); *F16C 33/64* (2013.01); *C21D 2211/008* (2013.01)

(58) Field of Classification Search
CPC ... C21D 9/40; C21D 2211/008; C22C 38/001; C22C 38/02; C22C 38/04; C22C 38/22; C22C 38/32
See application file for complete search history.

(56) References Cited

U.S. PATENT DOCUMENTS

| | | | |
|---|---|---|---|
| 2019/0211429 | A1 | 7/2019 | Jehara et al. |
| 2019/0249718 | A1 | 8/2019 | Nazaki et al. |
| 2020/0080594 | A1 | 3/2020 | Inazaki et al. |

FOREIGN PATENT DOCUMENTS

| | | | | |
|---|---|---|---|---|
| JP | H10-36945 | A | 2/1998 | |
| JP | 2000-345304 | A | 12/2000 | |
| JP | 2010-077525 | A | 4/2010 | |
| JP | 2010-265487 | A | 11/2010 | |
| JP | 5368887 | B2 | 12/2013 | |
| JP | 2020-180313 | A | 11/2020 | |
| WO | 2017/141928 | A1 | 8/2017 | |
| WO | WO-2018025063 | A1 * | 2/2018 | ......... B23K 35/3086 |
| WO | 2018/008674 | A1 | 7/2018 | |

OTHER PUBLICATIONS

JP H10-36945 A. Machine translation. (Year: 1998).*
Gulyaev, A. P. Cold Treatment of Steel. (Translated from Metallovedenie i Termicheskaya Orabotka Metallov. No. 11, pp. 19-26, Nov. 1998). Metal Science and Heat Treatment. vol. 40, Nos. 11-12. pp. 449-455. (Year: 1998).*
Pandit, Aditya. Alloy Steel: Properties and Uses. Posted on Mar. 14, 2017. https://www.amardeepsteel.com/blog/SpecificBlog/1/#:~:text=These%20components%20are%20th%20bearings%20inner%20and,surface%20to%20resist%20subsurface%20rolling%20contact%20fatigue. (Year: 2017).*
International Search Report for corresponding International Application No. PCT/JP2020/036329 mailed Nov. 24, 2020.
Written Opinion for corresponding International Application No. PCT/JP2020/036329 mailed Nov. 24, 2020.
English translation of Written Opinion for corresponding International Application No. PCT/JP2020/036329 dated Nov. 24, 2020.
Notice of Reasons for Refusal dated Jul. 1, 2024 for corresponding Japanese Application No. 2022-551526 and English translation.

* cited by examiner

PRIOR ART

Fig. 4A
Fig. 4B
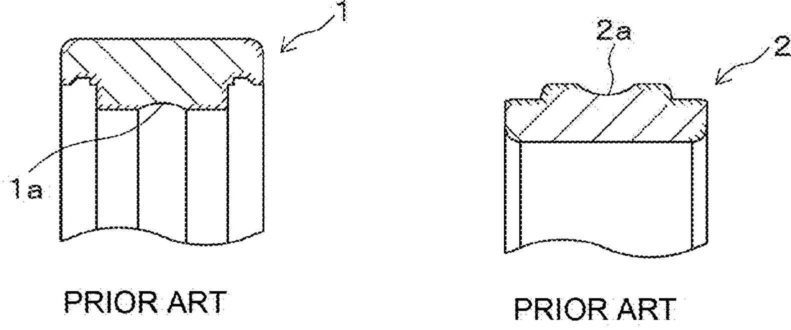
Fig. 5
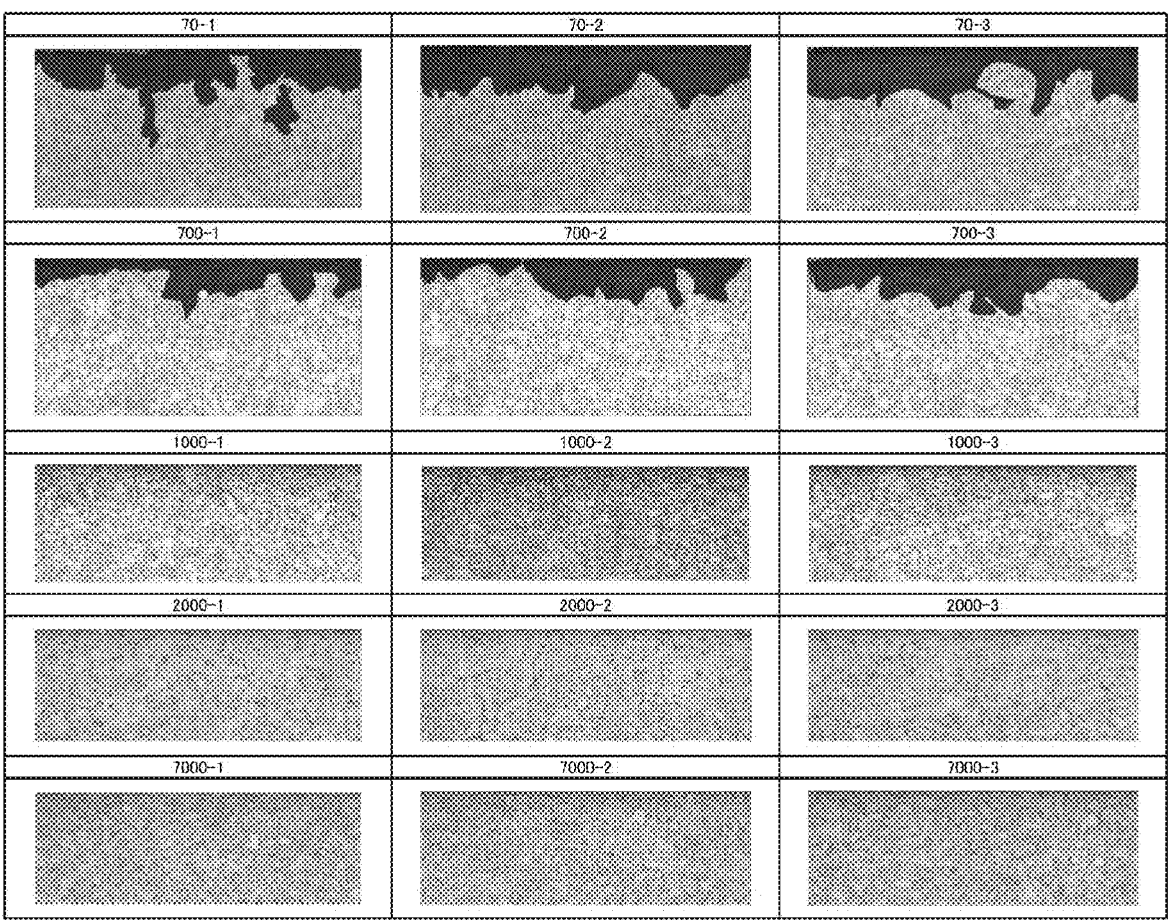

HIGHLY CORROSION-RESISTANT STAINLESS STEEL COMPONENT AND METHOD OF MANUFACTURING SAME, METHOD OF HEAT-TREATING STAINLESS STEEL COMPONENT, AND ROLLING BEARING AND METHOD FOR MANUFACTURING SAME

CROSS-REFERENCE TO RELATED APPLICATIONS

This application is a national stage entry of International Application No. PCT/JP2020/036329 filed on Sep. 25, 2020, the entire disclosures of which are hereby incorporated herein by reference.

TECHNICAL FIELD

The present invention relates to a highly corrosion-resistant stainless steel component having excellent corrosion resistance.

BACKGROUND ART

In general, martensitic stainless steels typified by SUS440C are used as bearing materials for rolling bearings required to be corrosion-resistant. However, SUS440C contains from 16 to 18 wt. % of chromium for improving corrosion resistance, but the carbon content is as high as from 0.95 to 1.2 wt. % in order to ensure the hardness, and thus a large number of chromium carbides having a size of about 20 μm are formed, so the corrosion resistance is not so high. Therefore, SUS440C is not suitable for use in a severe corrosive environment involving exposure to a strong alkaline disinfectant solution, seawater, or rainwater. In addition, although ferritic stainless steels and austenitic stainless steels are more corrosion-resistant than martensitic stainless steels, the ferritic stainless steels and austenitic stainless steels have a low strength. For example, the austenitic stainless steels have a hardness of about HRC 40 even when cold-worked, and are hardly used for rolling bearings.

Therefore, as a martensitic stainless steel having both high corrosion resistance and high hardness, there has been developed a highly corrosion-resistant martensitic stainless steel containing nitrogen and molybdenum instead of reducing the carbon content to achieve both high corrosion resistance and high hardness, as in Patent Document 1.

CITATION LIST

Patent Literature

Patent Document 1: JP 5368887 B

SUMMARY OF INVENTION

Technical Problem

The highly corrosion-resistant martensitic stainless steel disclosed in Patent Document 1 contains a large amount of nitrogen as a solid solution, and such a martensitic stainless steel containing a large amount of nitrogen as a solid solution is hardened in a vacuum furnace to obtain a desired hardness. Chromium and molybdenum are elements promoting ferrite formation, whereas nitrogen is an austenite-stabilizing element and suppresses ferrite formation. For this reason, if nitrogen at the surface layer portion escapes during vacuum hardening, the nitrogen concentration decreases to weaken the effect of suppressing ferrite, and ferrite is generated in the surface layer portion, so desired hardness may not be obtained. In JIS B1511:1993 standards for rolling bearings, the hardness of bearing rings for rolling bearings is required to be within a range of HRC 57 to 65. However, the present inventor has confirmed that the hardness at the surface layer portion (a range within a depth of approximately 50 μm from the surface) may only be less than HRC 55 due to ferrite formation.

Further, since ferrite has a body-centered cubic lattice structure, the solid solution limit of carbon is low. Ferrite has a solid solution limit of carbon of only about 0.02 wt. % at 727° C. Therefore, when cooling is performed from the austenite temperature range and ferrite begins to precipitate at the surface layer portion, carbon is released to the outside of the ferrite. As a result, carbon is concentrated around ferrite to form chromium carbide. Chromium around the ferrite is used in the carbide to form a chromium-deficient layer, resulting in a problem that the corrosion resistance around the ferrite decreases.

The present invention has been made in view of the above circumstances, and an object of the present invention is to provide a highly corrosion-resistant stainless steel component achieving both high corrosion resistance and high hardness without containing ferrite at the surface layer portion.

Solution to Problem

The present inventor has found that when the highly corrosion-resistant martensitic stainless steel containing a large amount of nitrogen as a solid solution is heated to a temperature in the range from 1050 to 1120° C. under a nitrogen atmosphere having a nitrogen partial pressure of 1000 Pa or more and less than 10000 Pa and hardened, the nitrogen as a solid solution escaping from the surface layer portion is suppressed, and no ferrite structure is formed at the surface layer portion.

The present invention has been made on the basis of the above findings, and is a highly corrosion-resistant stainless steel component made of highly corrosion-resistant martensitic stainless steel containing, by weight, from 0.35 to 0.43% of C, 0.5% or less of Si, 0.5% or less of Mn, 0.04% or less of P, 0.04% or less of S, 15 to 17% of Cr, from 0.1 to 0.3% of W, from 1.5 to 3.0% of Mo, from 0.001 to 0.005% of B, and from 0.12 to 0.18% of N, with a balance being Fe and an inevitable impurity, wherein a matrix structure of a surface layer portion of an entire outer surface is a two-phase mixed structure containing retained austenite and martensite, and a surface hardness is HRC 57 or more. Here, the "surface layer portion" refers to a range from the surface to a depth of about 50 μm.

In the highly corrosion-resistant stainless steel component of the present invention, the matrix structure of the surface layer portion of the entire outer surface exhibits a two-phase mixed structure containing retained austenite and martensite, and thus the area ratio of ferrite at the surface layer portion is zero, that is, no ferrite is present. As a result, a high surface hardness of HRC 57 or more can be obtained. In addition, since no ferrite is present at the surface layer portion, carbon is not partially concentrated, and thus formation of a chromium-deficient layer due to formation of chromium carbide is suppressed, so the corrosion resistance can be improved.

Another feature of the present invention is a rolling bearing having an outer ring and/or an inner ring composed of the above-described highly corrosion-resistant stainless steel component. Yet another feature of the present invention is an assembly including a plurality of unitary components, wherein at least one of the unitary components is the highly corrosion-resistant stainless steel component described above.

Still another feature of the present invention is a method of heat-treating a highly corrosion-resistant stainless steel component, including the steps of: preparing an intermediate component made of highly corrosion-resistant martensitic stainless steel containing, by weight, from 0.35 to 0.43% of C, 0.5% or less of Si, 0.5% or less of Mn, 0.04% or less of P, 0.04% or less of S, from 15 to 17% of Cr, from 0.1 to 0.3% of W, from 1.5 to 3.0% of Mo, from 0.001 to 0.005% of B, and from 0.12 to 0.18% of N, with a balance being Fe and an inevitable impurity; and heating the intermediate component to a temperature in a range from 1050 to 1120° C. under a nitrogen atmosphere having a nitrogen partial pressure of 1000 Pa or more and less than 10000 Pa and subjecting the intermediate component to hardening. Still another feature of the present invention is a method of manufacturing a highly corrosion-resistant stainless steel component including the above-described method of heat-treating a highly corrosion-resistant stainless steel component.

Next, the reasons for limiting the components in the present invention will be described. Note that in the following description, "%" means "wt. %" unless otherwise specified.

C: from 0.35 to 0.43%

C is a component effective for ensuring the hardness (wear resistance) of a steel component, but is also an austenite-forming element. Therefore, when C is added in a large amount, eutectic carbides are easily formed, and cracks are easily generated. In addition, since excessive addition also deteriorates corrosion resistance, the upper limit was set to 0.43% where good corrosion resistance was confirmed. The lower limit was set to 0.35% where no ferrite was formed at the surface layer portion after the heat treatment and a hardness of HRC 57 or more was obtained.

Si: 0.5% or less

When the content of Si is excessive, the toughness is remarkably lowered and the hot workability is adversely affected, and thus the content is preferably as small as possible. However, the content was set to 0.5% or less in consideration of the production cost.

Mn: 0.5 wt. % or less

Mn is an austenite-stabilizing element, and excessive addition increases the amount of retained austenite, and thus hardness after heat treatment is lowered, corrosion resistance is also deteriorated, and dimensional change due to aging is likely to occur. Therefore, the content of Mn is preferably as small as possible, but the content was set to 0.5% or less in consideration of the production cost.

P: 0.04% or less

P is a component precipitating at crystal grain boundaries to cause cold brittleness, and thus is desirably as small as possible in order to avoid cold brittleness. However, the content is set to 0.04% or less in consideration of the production cost.

S: 0.04% or less

Since S deteriorates the corrosion resistance and deteriorates the hot workability, the content is set in the range of 0.04% or less.

Cr: from 15 to 17%

Cr forms a strong non-conductive film for stainless steel, and thus is an indispensable element for obtaining high corrosion resistance and needs to be added in a large amount. According to the results of the salt spray test, when the Cr content was less than 15%, good corrosion resistance was not obtained even when the N content was sufficient as will be described later, and thus the lower limit was set to 15%. However, Cr may also be a factor inhibiting martensitic transformation by forming ferrite. When the content of Cr exceeds 17%, ferrite is formed at the surface layer portion after hardening, causing a decrease in hardness. Therefore, the upper limit was set to 17%.

Mo: from 1.5 to 3.0%

Mo has effects of increasing the solid solution limit of N, improving the corrosion resistance, and improving the hardenability. In order to obtain such an effect, addition of 1.5% or more is necessary. However, excessive addition causes a decrease in toughness and ferrite formation in the vicinity of the surface layer, and thus the upper limit was set to 3.0%.

N: from 0.12 to 0.18%

N is a highly effective element for improving the surface hardness and corrosion resistance of the martensitic stainless steel after heat treatment. In order to obtain such an effect, the content of N needs to be 0.12% or more. On the other hand, the solid solution limit where no blow (bubble) is formed in the material by atmospheric dissolution more economical than the pressure dissolution method and a martensitic stainless steel capable of being put to practical use can be made was 0.18%, so the upper limit was set to 0.18%. Thus, the production cost is suppressed.

B: from 0.001% to 0.005%

Addition of B causes BN to precipitate and is effective for improving the strength and hardenability, but in order to obtain this effect, addition of 0.001% or more is necessary. On the other hand, excessive addition causes a decrease in toughness, and thus the upper limit of the amount of addition is set to 0.005% or less.

W: from 0.1% to 0.3%

W is a component improving corrosion resistance and acting as a solid solution strengthening element to contribute to improvement in strength. In order to obtain this effect, addition of 0.1% or more is necessary. On the other hand, since excessive addition causes a decrease in toughness, the upper limit was set to 0.3% where satisfactory performance was obtained.

Matrix Structure

The matrix structure is preferably a two-phase mixed structure containing 13 vol % or less of retained austenite and the balance of martensite. When soft retained austenite is suppressed to 13 vol % or less and the balance is martensite, hardness of HRC 57 or more can be ensured. Note that the matrix structure refers to a structure of a base (matrix) excluding carbides, nitrides, and inclusions.

Advantageous Effects of Invention

According to the present invention, it is possible to provide a highly corrosion-resistant stainless steel component achieving both high corrosion resistance and high hardness without containing ferrite at a surface layer portion.

BRIEF DESCRIPTION OF DRAWINGS

FIG. 4 is a cross-sectional view illustrating an example of an outer ring (A) and an inner ring (B) of a rolling bearing of another comparative example.

FIG. 5 is a micrograph of a metal structure according to the embodiment of the present invention.

DESCRIPTION OF EMBODIMENTS

Figure 1:
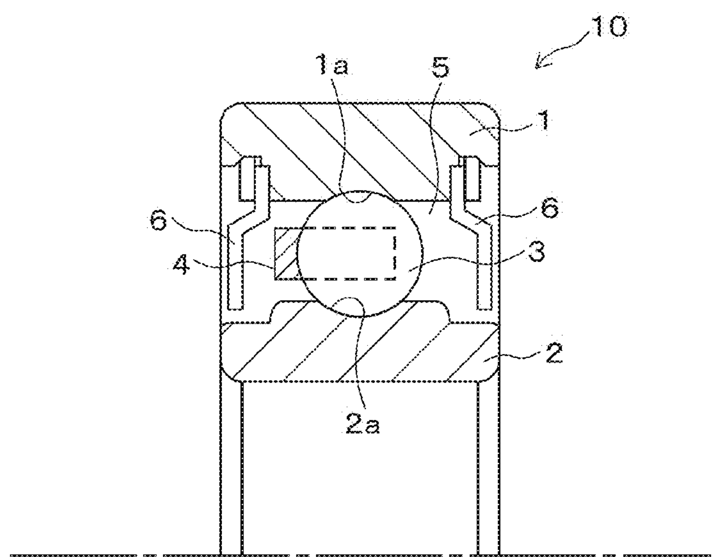
FIG. 1 is a cross-sectional view illustrating a rolling bearing according to an embodiment of the present invention.

FIG. 1 is a cross-sectional view illustrating a rolling bearing (deep groove ball bearing, assembly) 10 according to an embodiment of the present invention. As illustrated in FIG. 1, the rolling bearing 10 includes an outer ring 1 and an inner ring 2 as bearing rings. A raceway groove 1*a* having an arc-shaped cross section is formed at the inner peripheral surface of the outer ring 1, and a raceway groove 2*a* having an arc-shaped cross section is formed at the outer peripheral surface of the inner ring 2. Between the raceway grooves 1*a* and 2*a*, a plurality of balls 3 as rolling elements are arranged at equal intervals along the circumferential direction. The plurality of balls 3 are held in a plurality of pockets of a retainer 4, respectively. The retainer 4 can be made of resin such as polyamide or polyetheretherketone, or metal. In addition, the type of the retainer 4 is not particularly limited, and an arbitrary shape such as a crowned retainer, a machined retainer, or a corrugated retainer can be selected. The retainer 4 in FIG. 1 is a crowned retainer.

A bearing space 5 between the outer ring 1 and the inner ring 2 is sealed by a metal sealing member 6 (metal shield). The sealing member 6 is not limited to metal shields, and a non-contact or contact rubber seal may be used. Additionally, the bearing space 5 is filled with grease as a lubricant. The grease used is selected in accordance with the application of the rolling bearing 10. Exemplary greases include, but are not limited to, lithium soap greases and urea greases.

The outer ring 1 and the inner ring 2 are formed of highly corrosion-resistant martensitic stainless steel. In addition, the outer ring 1 and the inner ring 2 are subjected to a heat treatment according to the present invention including hardening, sub-zero treatment, and tempering. Over the entire surface of the outer ring 1 and the inner ring 2, the matrix structure of the surface layer portion is composed of martensite and 13 vol % or less of retained austenite, and no ferrite is formed.

That is, the area ratio of ferrite at the surface layer portion is zero over the entire surface of the outer ring 1 and the inner ring 2. As a result, the hardness of the surfaces and the interior is increased to HRC 57 or more. Note that in some applications, only the outer ring or the inner ring is required to have high corrosion resistance. In such a case, the highly corrosion-resistant stainless steel component according to the present invention may be used only for the outer ring or only for the inner ring. For example, in a rolling bearing for supporting a sliding door of an automobile, the outer ring is mainly exposed to rainwater or muddy water, and thus higher corrosion resistance is required for the outer ring.

The ball 3 may be made of metal or ceramic. Note that the rolling element of the rolling bearing is not limited to a ball 3 having a spherical shape. The rolling element may be a cylindrical roller and the rolling bearing may be a roller bearing. When the ball 3 is made of metal, the material of the ball 3 may be the same highly corrosion-resistant martensitic stainless steel as the material of the outer ring 1 and the inner ring 2. Accordingly, the ball 3 having corrosion resistance and hardness equal to or higher than the corrosion resistance and hardness of the outer ring 1 and the inner ring 2 is obtained. However, if the use environment is not a severe corrosive environment, the ball 3 is prevented from corrosion to some extent by the grease. Therefore, bearings steels inferior to the highly corrosion-resistant martensitic stainless steel in corrosion resistance (for example, SUJ2) or conventional martensitic stainless steels for bearings (for example, SUS440C) may be used.

Figure 2A:
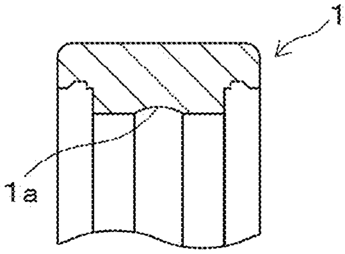
FIG. 2 is a cross-sectional view illustrating an outer ring (A) and an inner ring (B) of the rolling bearing of the embodiment.
Figure 2B:
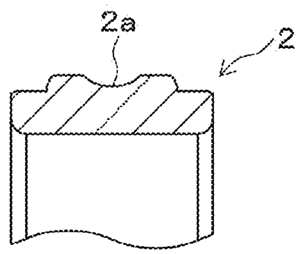
Figure 3A:
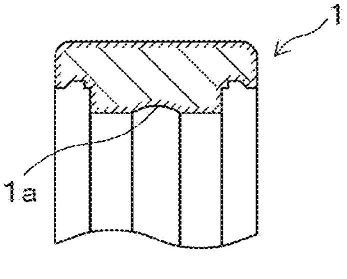
FIG. 3 is a cross-sectional view illustrating an example of an outer ring (A) and an inner ring (B) of a rolling bearing of a comparative example.
Figure 3B:
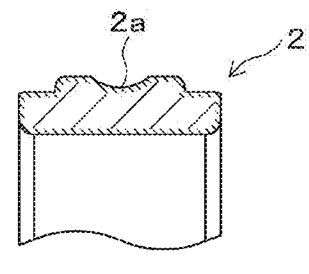

FIG. 2 illustrates the outer ring 1 and the inner ring 2 of the present embodiment after the heat treatment according to the present invention. As illustrated in FIG. 2, in the outer ring 1 and the inner ring 2 of the present embodiment, no ferrite is formed at the surface layer portion of the entire surface. On the other hand, FIG. 3 illustrates the outer ring 1 and the inner ring 2 of a comparative example after being subjected to the same heat treatment. In the outer ring 1 and the inner ring 2 of the comparative example, ferrite is formed at the surface layer portion of the entire surface. After the heat treatment, the end surface, the outer cylindrical surface (radially outer surface), and the raceway groove 1*a* of the outer ring 1, and the end surface, the inner cylindrical surface (radially inner surface), and the raceway groove 2*a* of the inner ring 2 are finished by grinding.

FIG. 4 illustrates the state of the outer ring and the inner ring of FIG. 3 after being subjected to finishing grinding to remove the ferrite layer of the surface layer portion. As illustrated in FIG. 4, the end surface, the outer cylindrical surface, and the raceway groove 1*a* of the outer ring 1, and the end surface, the inner cylindrical surface, and the raceway groove 2*a* of the inner ring 2 are finished by grinding, and thus the ferrite layer of the surface layer portion in these portions has been removed. However, the ferrite layer remains at the surface layer portion even after finishing, at the cylindrical surface located at the outer side in the axial direction of the raceway grooves 1*a*, 2*a* not ground at the time of finishing, the sealing groove for attaching the sealing member 6, the chamfered portion, and the like. As described above, the ferrite layer of the surface layer portion causes a decrease in corrosion resistance and hardness. Therefore, the rolling bearing using the outer ring 1 and the inner ring 2 as illustrated in FIG. 4 is not desirable since portions inferior in corrosion resistance and hardness remain. In addition, since the surface of the raceway groove 1*a* is super-finished, it is difficult to achieve the state illustrated in FIG. 4 because the removal amount is too large, leading to an increase in production cost. Therefore, it is important not to form the ferrite layer at the surface layer portion by the heat treatment in order to suppress the production cost.

Next, the heat treatment conditions for obtaining the rolling bearing of the embodiment will be described.

After the outer ring and the inner ring are formed by cutting, it is desirable that the outer ring and the inner ring are heated to a temperature in the range from 1050 to 1120° C. in a heat treatment oven under a nitrogen atmosphere having a nitrogen partial pressure of 1000 Pa or more and less than 10000 Pa and hardened, then subjected to a sub-zero treatment of cooling to a temperature in the range from −30 to −90° C., and then tempered at a temperature in the range from 150 to 200° C. This is because the sub-zero treatment is effective in reducing the amount of retained austenite and increasing hardness.

Nitrogen Partial Pressure During Hardening

When the nitrogen partial pressure is less than 1000 Pa, the nitrogen concentration at the surface layer portion decreases during hardening, and ferrite is formed. On the other hand, when the nitrogen partial pressure is 10000 Pa or more, in the martensitic stainless steel according to the present invention, nitrogen may be solid-solved at the surface layer portion and the nitrogen concentration may be too high. The solid solution of nitrogen from the outside increases the amount of retained austenite formed after hardening and tempering, resulting in a decrease in tempered hardness. In addition, nitrides are formed by the addition of nitrogen. However, when nitrogen is excessively added by solid solution from the outside, the effect of reducing toughness becomes larger than the improvement in hardness, and brittle fracture is promoted.

Therefore, it is desirable that the nitrogen partial pressure is 1000 Pa or more and less than 10000 Pa in order to prevent nitrogen from escaping from the surface layer portion and also to avoid solid solution of nitrogen from the outside. In order to obtain such a nitrogen atmosphere, it is preferable to reduce the pressure in the furnace from atmospheric to 200 Pa or less, more preferably 100 Pa or less, before introducing the nitrogen gas. By sufficiently reducing the pressure in the furnace before introducing the nitrogen gas in this way, the amount of gases other than the nitrogen gas and moisture is reduced, and unexpected reaction with the metal can be avoided.

Hardening Temperature

When the hardening temperature is less than 1050° C., the formation of martensite by rapid cooling (oil or water hardening) is not sufficient, and it is difficult to obtain a hardness of HRC 57 or more. On the other hand, when the hardening temperature exceeds 1120° C., it becomes difficult to obtain a hardness of HRC 57 or more because prior austenite grains become coarse and carbides are solid-solved. Therefore, the hardening temperature is desirably from 1050 to 1120° C.

Note that the present invention is not limited to bearing rings or rolling elements for rolling bearings, but is applicable to any highly corrosion-resistant stainless steel components used as mechanical components such as bolts or nuts.

EXAMPLES

Table 1 shows the component contents of the martensitic stainless steels of Examples and Comparative Examples in wt. %. In addition, the desirable content range of the present invention is referred to as an effective range and shown.

1. Investigation of Hardness and Corrosion Resistance

Intermediate components having an outside diameter of 13 mm, an inside diameter of 11.54 mm, and a height of 4 mm were produced by machining bar materials of martensitic stainless steel having the components shown in Table 1, hardened using a heat treatment oven under the conditions of nitrogen partial pressure and hardening temperature shown in Table 1, subjected to a sub-zero treatment of cooling to a temperature in the range from −30 to −90° C., and then tempered at a temperature in the range from 150 to 200° C. to obtain ring-shaped samples.

The hardness at a depth of 20 μm from the surfaces of the samples thus obtained was measured. In addition, cross sections of the samples were mirror-polished and then etched, and a structure of a region of 50 μm in depth from the surface and 100 μm in width was observed at three positions with a metallographic microscope. Then, the structure photographs illustrated in FIG. 5 were subjected to image analysis to calculate an area ratio (area %) of ferrite in each region of 50 μm×100 μm, and the average value of the area ratio of ferrite is shown in Table 1. Additionally, the amount of retained austenite (retained γ) was obtained by measuring the volume fraction (vol %) by an X-ray diffraction method with an X-ray stress measurement device (available from PROTO, model number iXRD).

In addition, plates having a length of 50 mm, a width of 20 mm, and a thickness of 2 mm were produced by machining bar materials of martensitic stainless steel having the components shown in Table 1, and were subjected to heat treatment under the same conditions as the conditions described above. The samples thus obtained were subjected to a neutral salt spray test for 96 hours in accordance with JIS Z2371, and the rating numbers were evaluated based on the rating number method of JIS Z2371:2015 standards. When the rating number was 9.8 or more, the corrosion resistance was judged to be good and evaluated as "A", and when the rating number was less than 9.8, the corrosion resistance was judged to be insufficient and evaluated as "B". The above measurement results and test results are shown in Table 1 together with the material components of each sample.

Table 1

| Component | C (wt. %) | Si (wt. %) | Mn (wt. %) | P (wt. %) | S (wt. %) | Cr (wt. %) | W (wt. %) | Mo (wt. %) | B (wt. %) | N (wt. %) |
|---|---|---|---|---|---|---|---|---|---|---|
| Effective range of invention | 0.35 to 0.43 | Max. 0.5 | Max. 0.5 | Max. 0.04 | Max. 0.04 | 15 to 17 | 0.1 to 0.3 | 1.5 to 3.0 | 0.001 to 0.005 | 0.12 to 0.18 |
| Example 1 | 0.40 | 0.20 | 0.31 | 0.02 | 0.002 | 15.92 | 0.24 | 1.55 | 0.0045 | 0.15 |
| Example 2 | 0.43 | 0.41 | 0.43 | 0.02 | 0.010 | 15.33 | 0.16 | 1.83 | 0.0014 | 0.12 |
| Example 3 | 0.36 | 0.19 | 0.22 | 0.02 | 0.036 | 16.38 | 0.25 | 2.70 | 0.0036 | 0.18 |
| Example 4 | 0.38 | 0.25 | 0.24 | 0.03 | 0.019 | 16.80 | 0.11 | 2.56 | 0.0029 | 0.13 |
| Example 5 | 0.35 | 0.28 | 0.18 | 0.01 | 0.011 | 16.11 | 0.17 | 1.95 | 0.0022 | 0.12 |
| Comparative Example 1 | 0.33 | 0.23 | 0.33 | 0.02 | 0.004 | 16.45 | 0.19 | 1.94 | 0.0024 | 0.16 |
| Comparative Example 2 | 0.38 | 0.36 | 0.27 | 0.01 | 0.008 | 16.01 | 0.20 | 2.23 | 0.0019 | 0.11 |
| Comparative Example 3 | 0.41 | 0.26 | 0.33 | 0.01 | 0.005 | 15.94 | 0.18 | 2.01 | 0.0017 | 0.16 |
| Comparative Example 4 | 0.39 | 0.34 | 0.21 | 0.02 | 0.008 | 15.88 | 0.21 | 2.05 | 0.0020 | 0.16 |
| Comparative Example 5 | 0.41 | 0.20 | 0.34 | 0.02 | 0.002 | 15.99 | 0.28 | 2.32 | 0.0030 | 0.15 |
| Comparative Example 6 | 0.41 | 0.20 | 0.34 | 0.02 | 0.002 | 15.99 | 0.28 | 2.32 | 0.0030 | 0.15 |

-continued

| | | | | | | | | | | |
|---|---|---|---|---|---|---|---|---|---|---|
| Comparative Example 7 | 0.39 | 0.33 | 0.27 | 0.02 | 0.003 | 17.37 | 0.30 | 2.13 | 0.0018 | 0.16 |
| Comparative Example 8 | 0.34 | 0.18 | 0.31 | 0.01 | 0.007 | 16.23 | 0.22 | 1.95 | 0.0021 | 0.11 |
| Comparative Example 9 | 0.44 | 0.22 | 0.17 | 0.01 | 0.010 | 16.13 | 0.26 | 2.00 | 0.0016 | 0.15 |
| Comparative Example 10 | 0.39 | 0.22 | 0.34 | 0.02 | 0.002 | 16.09 | 0.24 | 2.44 | 0.0030 | 0.10 |
| Comparative Example 11 | 0.40 | 0.18 | 0.25 | 0.02 | 0.008 | 14.73 | 0.20 | 2.09 | 0.0028 | 0.15 |
| Comparative Example 12 | 0.42 | 0.30 | 0.29 | 0.01 | 0.006 | 15.89 | 0.11 | 1.11 | 0.0020 | 0.14 |
| SUS440C | 1.05 | 0.25 | 0.33 | 0.01 | 0.010 | 16.71 | 0.02 | 0.44 | 0.0001 | 0.01 |

| Component | Nitrogen partial pressure (Pa) | Hardening temperature (° C.) | Ferrite amount at surface layer portion (area %) | Surface hardness (HRC) | Corrosion resistance evaluation | Rating number | Retained γ (vol %) |
|---|---|---|---|---|---|---|---|
| Effective range of invention | 1000 to less than 10000 | 1050 to 1120 | Zero | 57 or more | A | 9.8 or more | 15 or less |
| Example 1 | 2000 | 1070 | 0 | 60 | A | 10 | 11.5 |
| Example 2 | 1000 | 1060 | 0 | 59 | A | 9.8 | 12.2 |
| Example 3 | 7000 | 1050 | 0 | 59 | A | 10 | 9.5 |
| Example 4 | 1000 | 1100 | 0 | 58 | A | 10 | 10.1 |
| Example 5 | 2000 | 1050 | 0 | 57 | A | 9.8 | 8.3 |
| Comparative Example 1 | 1000 | 1070 | 0 | 55 | A | 10 | 10.8 |
| Comparative Example 2 | 2000 | 1060 | 0 | 56 | A | 9.8 | 9.6 |
| Comparative Example 3 | 1000 | 1040 | 0 | 56 | A | 10 | 8.2 |
| Comparative Example 4 | 2000 | 1130 | 0 | 56 | A | 10 | 7.9 |
| Comparative Example 5 | 70 | 1060 | 28% | 51 | B | 9.3 | 13.4 |
| Comparative Example 6 | 700 | 1060 | 19% | 52 | A | 9.5 | 12.2 |
| Comparative Example 7 | 1000 | 1070 | 6% | 54 | A | 9.8 | 10.6 |
| Comparative Example 8 | 1000 | 1080 | 4% | 53 | A | 9.8 | 9.8 |
| Comparative Example 9 | 2000 | 1090 | 0 | 60 | B | 7 | 8.3 |
| Comparative Example 10 | 2000 | 1080 | 0 | 57 | B | 8 | 10.5 |
| Comparative Example 11 | 2000 | 1060 | 0 | 58 | B | 8 | 11.8 |
| Comparative Example 12 | 2000 | 1060 | 0 | 58 | B | 8 | 9.6 |
| SUS440C | 70 | 1040 | 0 | 60 | B | 5 | 6.9 |

"A": good,
"B": insufficient

As shown in Table 1, in Examples 1 to 5, all the ranges of the components as essential components of the present invention are satisfied, and preferable ranges of the nitrogen partial pressure and the hardening temperature are also satisfied. As a result, ferrite was not present at the surface layer portion at an area ratio of zero, and a matrix structure composed of a two-phase mixed structure containing from 8.3 to 12.2 vol % of retained austenite and martensite was formed. In addition, when a large number of carbides and inclusions dispersed in the matrix had long diameters exceeding 10 μm, corrosion resistance was adversely affected. In Examples 1 to 5, 95% or more of the carbides and inclusions dispersed in the two-phase mixed structure of the matrix had long diameters of 10 μm or less. Therefore, the rating numbers indicating the corrosion resistance were 9.8 or more in all Examples, and the corrosion resistance was evaluated as "A" (good). Further, the hardness of the surface layer portion was all HRC 57 or more, and satisfied the hardness of bearing rings for rolling bearings specified in the JIS B1511:1993 standards.

On the other hand, in Comparative Example 1, the nitrogen partial pressure at the time of hardening was set to 1000 Pa, and thus no ferrite was formed at the surface layer portion. However, since the content of C was less than 0.35%, the hardness of the surface layer portion was HRC 55 and did not satisfy the JIS B1511:1993 standards for rolling bearings. In Comparative Example 2, the nitrogen partial pressure at the time of hardening was set to 2000 Pa, and thus no ferrite was formed at the surface layer portion. However, since the content of N was less than 0.12%, the hardness was only HRC 56.

In Comparative Example 3, the nitrogen partial pressure at the time of hardening was set to 1000 Pa as in Comparative Example 1, and thus no ferrite was formed at the surface layer portion. However, since the hardening temperature was less than 1050° C., the formation of martensite was insufficient and only the hardness of HRC 56 was obtained. In Comparative Example 4, the nitrogen partial pressure at the time of hardening was 2000 Pa and no ferrite was formed at the surface layer portion. However, since the hardening temperature exceeded 1120° C., the hardness was only HRC 56 due to coarsening of prior austenite grains and solid solution of carbides.

In Comparative Example 5, the nitrogen partial pressure at the time of hardening was only 70 Pa, and thus the ferrite amount at the surface layer portion reached 28 area % in area ratio, and the hardness was only HRC 51. In Comparative Example 6, the nitrogen partial pressure at the time of hardening was 700 Pa, and thus the ferrite amount at the surface layer portion reached 19 area %, and the hardness was only HRC 52.

In Comparative Example 7, although the nitrogen partial pressure at the time of hardening was 1000 Pa, the ferrite amount at the surface layer portion was 6 area %, and the hardness was HRC 54. This is considered to be because in Comparative Example 7, the content of Cr as a ferrite-forming element exceeded 17%, and thus ferrite was formed at the surface layer portion after hardening, causing a decrease in hardness.

In Comparative Example 8, although the nitrogen partial pressure at the time of hardening was 1000 Pa, the ferrite amount at the surface layer portion was 4 area %, and the hardness was HRC 53. This is considered to be because in Comparative Example 8, the content of C was less than 0.35%, and thus the formation of austenite was insufficient and ferrite remained, and also because the content of N was less than 0.12%.

In Comparative Example 9, the nitrogen partial pressure at the time of hardening was 2000 Pa and no ferrite was present at the surface layer portion. However, since the content of C exceeded 0.43%, the rating number was 7, it could not be said that there was sufficient corrosion resistance, and the evaluation of the corrosion resistance was "B" (insufficient). In Comparative Example 10, the nitrogen partial pressure at the time of hardening was 2000 Pa, and thus no ferrite was formed. However, since the content of N was as low as 0.10%, the rating number was 8 and the evaluation of the corrosion resistance was "B".

In Comparative Example 11, the nitrogen partial pressure at the time of hardening was 2000 Pa and thus no ferrite was formed. However, since the content of Cr was as low as 14.73%, sufficient corrosion resistance was not obtained, the rating number was 8, and the evaluation of the corrosion resistance was "B". In Comparative Example 12, the nitrogen partial pressure at the time of hardening was 2000 Pa, and thus no ferrite was formed. However, since the content of Mo was as low as 1.11%, the rating number was 8 and the evaluation of the corrosion resistance was "B".

Note that for comparison, the components of SUS440C and the test results are also shown in Table 1. As is clear from Table 1, SUS440 has a hardness of HRC 57, applicable to a roller bearing, but cannot be used in a severe corrosive environment since the rating number is 5 and the evaluation of the corrosion resistance is "B".

2. Structure Observation

Hereinafter, structure observations performed on Examples 1 to 3 where the component content is within the effective range and no ferrite is present at the surface layer portion, that is, the ferrite area ratio is zero, and Comparative Examples 5 and 6 where the component content is within the effective range but ferrite is present at the surface layer portion will be described in detail. Table 2 shows the ferrite amount at three positions of the surface layer portion of each sample in ferrite area ratio (area %), and Table 3 shows the average value of the ferrite area ratio at three positions and the average value of the Rockwell C hardness (HRC) at three positions at a depth of 20 μm from the surface of each sample. The numbers ("70" to "7000") on the left side of the hyphen of the sample labels in Table 2 indicate the nitrogen partial pressure (unit: Pa) at the time of hardening.

In the structure observation, a cross section of the sample was mirror-polished and then etched with nital, and a region of 50 μm in depth from the surface and 100 μm in width of the surface layer portion was photographed at three positions with a metallographic microscope. Since ferrite is hard to be etched and looks white, such portions were made black by image processing before the area ratio was measured. FIG. 5 illustrates structure photographs of the surface layer portion after the image processing thus obtained. Regarding the samples 70-1 to 70-3 and the samples 700-1 to 700-3 having the nitrogen partial pressure of less than 1000 Pa at the time of hardening, the upper portion of the surface layer portion is illustrated in black in the structure photograph after the image processing, and it is clearly found that ferrite was formed in the vicinity of the sample surface. In the sample having the nitrogen partial pressure of 1000 Pa or more at the time of hardening, there is no portion illustrated in black even after the image processing, and it is found that no ferrite was formed. For each sample, the area ratio of ferrite for a region of 50 μm in depth from the surface and 100 μm in width was calculated using the thus image-processed structure photograph, and the average value of the area ratio of ferrite was defined as the ferrite area ratio at the surface layer portion of each sample.

Note that also in Comparative Examples 7 and 8, the ferrite area ratio was calculated by the same method. As shown in Table 2, in Comparative Example 5 where the nitrogen partial pressure at the time of hardening was 70 Pa, 26 area % or more of ferrite was formed at the surface layer portion, and from 16 to 23 area % of ferrite was formed at 700 Pa. Further, when the nitrogen partial pressure at the time of hardening is 1000 Pa or more, no ferrite was formed and the area ratio of ferrite is zero. Additionally, as shown in Table 3, when the nitrogen partial pressure at the time of hardening is 1000 Pa or more, the hardness at positions at a depth of 20 μm from the surface is HRC 59 or more. As a result, it was found that it is effective to set the nitrogen partial pressure at the time of hardening to 1000 Pa or more in order to prevent the formation of ferrite at the surface layer portion.

TABLE 2

| Sample | Label | Ferrite area ratio (area %) |
|---|---|---|
| Comparative Example 5 | 70-1 | 26 |
| Comparative Example 5 | 70-2 | 29 |
| Comparative Example 5 | 70-3 | 28 |
| Comparative Example 6 | 700-1 | 16 |
| Comparative Example 6 | 700-2 | 17 |
| Comparative Example 6 | 700-3 | 23 |
| Example 2 | 1000-1 | 0 |
| Example 2 | 1000-2 | 0 |
| Example 2 | 1000-3 | 0 |
| Example 1 | 2000-1 | 0 |
| Example 1 | 2000-2 | 0 |
| Example 1 | 2000-3 | 0 |
| Example 3 | 7000-1 | 0 |

TABLE 2-continued

| Sample | Label | Ferrite area ratio (area %) |
|---|---|---|
| Example 3 | 7000-2 | 0 |
| Example 3 | 7000-3 | 0 |

TABLE 3

| | Ferrite area ratio (area %) | HRC hardness at depth of 20 μm from surface |
|---|---|---|
| 70 Pa | 28 | 51 |
| 700 Pa | 19 | 52 |
| 1000 Pa | 0 | 59 |
| 2000 Pa | 0 | 60 |
| 7000 Pa | 0 | 59 |

3. Life Test

Using the above-described materials of Examples 1 to 5 and Comparative Examples 5 to 8 for the inner ring and the outer ring, a single-row deep groove ball bearing was produced as a test rolling bearing. The outer ring had an outside diameter of 13 mm, an inside diameter of 11.54 mm, and a width of 4 mm, and the inner ring had an outside diameter of 9 mm, an inside diameter of 7 mm, and a width of 4 mm. The ball had a diameter of 1.588 mm and was made of DD400 (martensitic stainless steel, hardness HRC 60). A crowned retainer made of polyamide was used as the retainer.

In the test rolling bearing, the outer ring was attached to the holder, the inner ring was fixed to one end portion of the shaft, the other end side of the shaft was inserted into a pair of rolling bearings of the test device, and the shaft was rotatably supported while being held in the horizontal direction. Then, the shaft was rotated at 5400 rpm with a radial load of 431 N (44 kgf) being applied to the holder in the vertical direction, and the test was performed until the test rolling bearing attached to the holder was locked (until the shaft stopped rotating). The elapsed time from the start of the test until the test rolling bearing was locked is defined as a lock time, and the average lock time of 10 samples is defined as an evaluation index. The results are shown in Table 4.

In Table 4, the numbers of the rolling bearing in Examples and Comparative Examples are the same as the numbers of the material in Examples and Comparative Examples for clarity. For example, a rolling bearing using the material of Example 1 is referred to as Example 1. Further, in order to find out the influence of the ferrite layer, in Comparative Examples, the inner ring and the outer ring are finished in a state where the surface layer hardness of the raceway surface is insufficient, in other words, in a state where the ferrite layer is left at the surface layer portion. Therefore, the surface layer portions after the dimensions of the inner ring and the outer ring of Comparative Examples are finished are in the states illustrated in FIGS. 3(A) and (B). In addition, sample numbers 1 to 10 were given to the ten rolling bearings of each Example and each Comparative Example.

TABLE 4

| | Examples of good surface layer hardness and corrosion resistance | | | | | Examples of insufficient surface layer hardness | | | |
|---|---|---|---|---|---|---|---|---|---|
| Sample number | Example 1 | Example 2 | Example 3 | Example 4 | Example 5 | Comparative Example 5 | Comparative Example 6 | Comparative Example 7 | Comparative Example 8 |
| 1 | 5 | 4.8 | 10.2 | 7.7 | 5.4 | 0.4 | 0.3 | 0.7 | 0.9 |
| 2 | 15.1 | 6.5 | 15.9 | 9.8 | 12.6 | 0.8 | 0.7 | 0.9 | 1.1 |
| 3 | 27.2 | 10.2 | 22.6 | 16.4 | 22.5 | 0.9 | 0.9 | 1.8 | 1.9 |
| 4 | 30.9 | 22.5 | 39.4 | 25.8 | 29.5 | 1.8 | 1.9 | 3.4 | 2.2 |
| 5 | 34.4 | 24.6 | 44.6 | 29.5 | 38.5 | 2.2 | 2.5 | 3.7 | 2.5 |
| 6 | 38.8 | 40.7 | 53.8 | 38.5 | 40.7 | 2.5 | 3 | 3.8 | 2.8 |
| 7 | 39.9 | 44.2 | 64.2 | 49.6 | 54 | 2.9 | 3.4 | 4.7 | 3.3 |
| 8 | 89.2 | 70.6 | 94.7 | 88.5 | 79.6 | 3.5 | 3.6 | 5.2 | 4.2 |
| 9 | 107.6 | 98.5 | 132 | 98.1 | 95.8 | 4.4 | 4.8 | 5.4 | 6 |
| 10 | 155.5 | 135.1 | 183.6 | 128.6 | 133.6 | 10.2 | 8.5 | 7.8 | 8.2 |
| Mean | 54 | 46 | 66 | 49 | 51 | 3 | 3 | 4 | 3 |

As shown in Table 4, in the rolling bearings of Examples 1 to 5, the average lock time was from 46 to 66 hours, whereas in the rolling bearings of Comparative Examples 5 to 8 where ferrite was present at the surface layer portion, the average lock time was only from 3 to 4 hours. From the above results, it was confirmed that in the rolling bearing of the present invention, no ferrite is present at the surface layer portion and the hardness is sufficient, so the life is long.

INDUSTRIAL APPLICABILITY

The present invention is applicable to the field of highly corrosion-resistant stainless steel components such as rolling bearings, and is suitably applicable to the field of highly corrosion-resistant stainless steel components used in particularly severe corrosive environments. Although the above-described Examples exemplified the case of the rolling bearing with highly corrosion-resistant stainless steel components, the present invention is not limited to the case, and the highly corrosion-resistant stainless steel components of the present invention can be used for an assembly used in particularly severe corrosive environments.

REFERENCE SIGNS LIST

- 1 Outer ring (highly corrosion-resistant stainless steel component)
- 1*a* Raceway groove
- 2 Inner ring (highly corrosion-resistant stainless steel component)
- 2*a* Raceway groove
- 3 Ball (rolling element)
- 4 Retainer
- 5 Bearing space

6 Sealing member
10 Rolling bearing (assembly)

The invention claimed is:

1. A method of heat-treating a highly corrosion-resistant stainless steel component, comprising the steps of:

preparing an intermediate component made of highly corrosion-resistant martensitic stainless steel containing, by weight, from 0.35 to 0.43% of C, 0.5% or less of Si, 0.5% or less of Mn, 0.04% or less of P, 0.04% or less of S, from 15 to 17% of Cr, from 0.1 to 0.3% of W, from 1.5 to 3.0% of Mo, from 0.001 to 0.005% of B, and from 0.14 to 0.18% of N, with a balance being Fe and an inevitable impurity; and heating the intermediate component to a temperature in a range from 1050 to 1120° C. under a nitrogen atmosphere having a nitrogen partial pressure of 1000 Pa or more and less than 10000 Pa and subjecting the intermediate component to hardening, wherein no ferrite is formed at a surface layer portion of the intermediate component during hardening.

2. The method of heat-treating a highly corrosion-resistant stainless steel component according to claim 1, comprising the steps of:

a sub-zero treatment of, after the hardening, cooling the intermediate component to a temperature in a range from −30 to −90° C.; and after the sub-zero treatment, heating the intermediate component to a temperature in a range from 150 to 200° C. and tempering.

3. The method of heat-treating a highly corrosion-resistant stainless steel component according to claim 1, wherein the highly corrosion-resistant stainless steel component is a bearing ring for a rolling bearing.

4. The method of heat-treating a highly corrosion-resistant stainless steel component according to claim 1, wherein the highly corrosion-resistant martensitic stainless steel contains from 0.15 to 0.18% of N.

5. The method of heat-treating a highly corrosion-resistant stainless steel component according to claim 1, further comprising the step of reducing a pressure in a furnace to 200 Pa or less before filling the furnace with nitrogen for heating the intermediate component.

6. A method of manufacturing a rolling bearing having a plurality of rolling elements disposed between an inner ring and an outer ring, wherein at least the inner ring or the outer ring is manufactured by the method of manufacturing a highly corrosion-resistant stainless steel component according to claim 1.

* * * * *